Jan. 13, 1942.　　W. D. CROCKER　　2,269,651
ROTOR FOR ELECTRIC GENERATORS
Filed Aug. 24, 1940　　2 Sheets-Sheet 1

INVENTOR.
WILLIAM D. CROCKER
BY
ATTORNEY

Jan. 13, 1942.　　　W. D. CROCKER　　　2,269,651
ROTOR FOR ELECTRIC GENERATORS
Filed Aug. 24, 1940　　　2 Sheets-Sheet 2
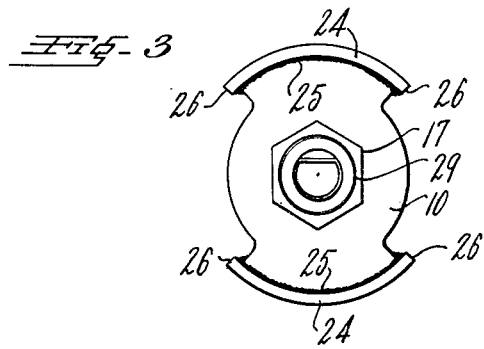
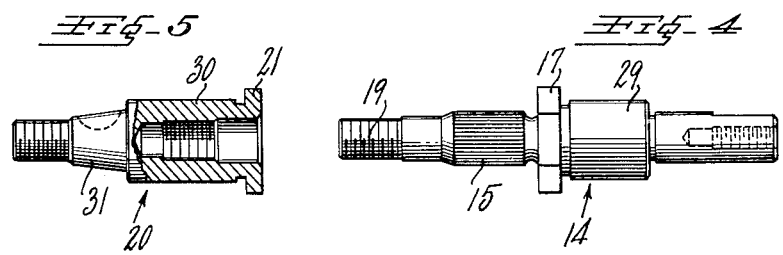
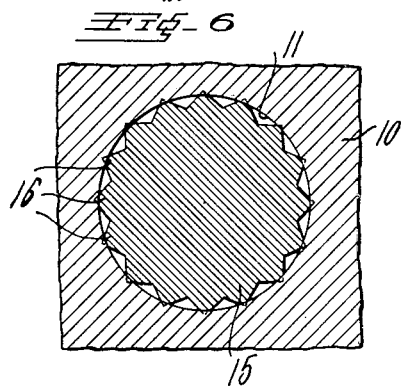
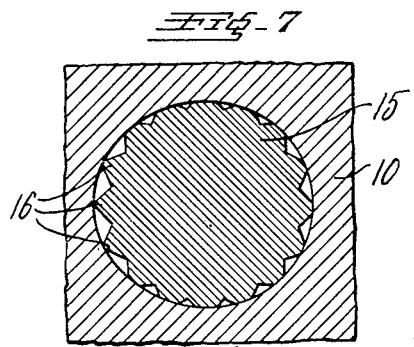
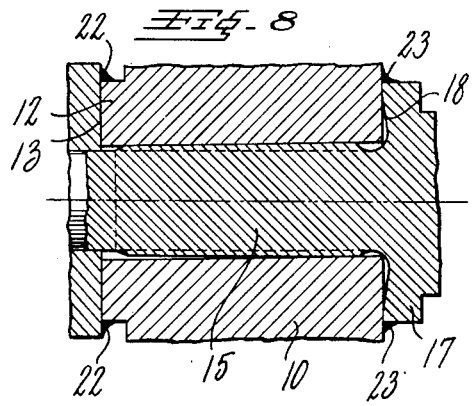
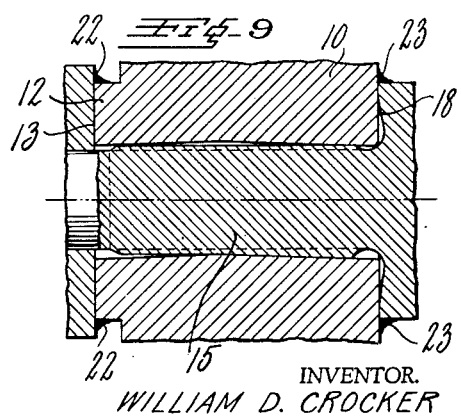
INVENTOR.
WILLIAM D. CROCKER
BY
ATTORNEY Patented Jan. 13, 1942

2,269,651

UNITED STATES PATENT OFFICE 2,269,651

ROTOR FOR ELECTRIC GENERATORS

William D. Crocker, Springfield, Mass., assignor to American Bosch Corporation, Springfield, Mass., a corporation of New York Application August 24, 1940, Serial No. 353,993

5 Claims. (Cl. 171—209)

This invention relates to rotors for electric generators and particularly to rotors for magneto electric generators in which the magnetic flux emanating from the magnet or magnets is periodically changed in value or reversed in direction through the generating winding at each period of ignition of an associated internal combustion engine.

One object of the invention is to provide an inexpensive and sturdy rotor in which a magnet of a hard and sometimes brittle alloy as aluminum, nickel and iron is fastened securely to a shaft in proper relation without causing an undue percentage of rejections in quantity production, notwithstanding inaccuracies and variations in the dimensions of the magnet material resulting for instance from the casting thereof.

The features of the rotor by which these and other objects are attained will be apparent from the following description taken in connection with the accompanying drawings which show, as an example, the preferred form of a bipolar magnet rotor with a plain drive-end bearing having the preferred form of lubricating arrangement in a multi-cylinder magneto.

Figure 1:
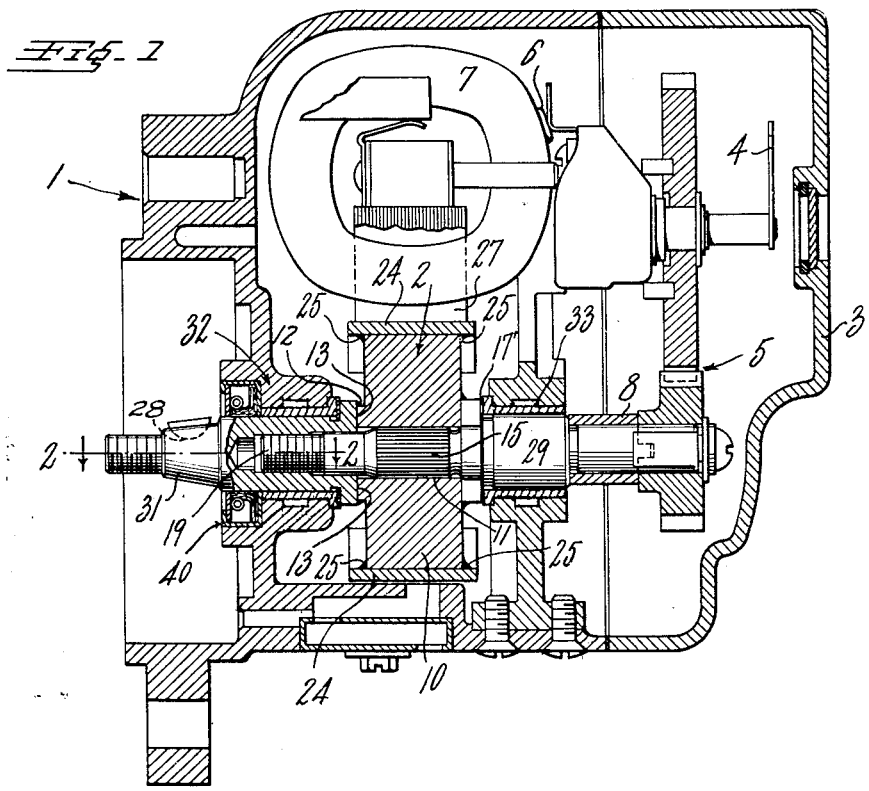
Figure 2:
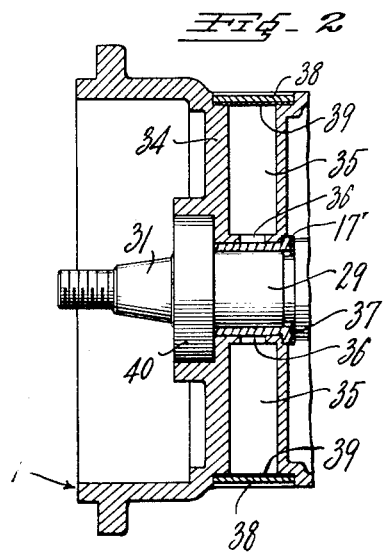

In the drawings, Fig. 1 is a central vertical section, partly in elevation, of a typical magneto having a magnet rotor and a drive-end bearing therefor in accordance with the invention; Fig. 2 is a sectional plan view, partly in elevation, of the drive-end bearing on line 2—2 of Fig. 1; Fig. 3 is an elevation of the assembled magnet rotor from the rear-end thereof; Fig. 4 is a side elevation of the rear-end part of the rotor shaft; Fig. 5 is a side elevation, partly in section, of the drive-end part of the rotor shaft; Fig. 6 is an enlarged sectional view illustrating a portion of the assembled rotor with a magnet having a substantially true shaft hole; Fig. 7 is a similar view illustrating a magnet rotor with a non-round shaft hole; Fig. 8 is an enlarged longitudinal sectional view illustrating a portion of the assembled rotor with a magnet having an axially slanted shaft hole; and Fig. 9 is a similar view with the magnet having a crooked shaft hole.

Referring now to Figs. 1 and 2, the magneto has a flange-mounting frame 1, a rotor 2 driven at the drive-end of an engine (not shown) through appropriate gearing in proper timed relation, a distributor plate 3 and a distributor rotor electrode 4 driven at a proper speed ratio and in timed relation by the magnet rotor through gearing 5 and electrically connected in well known manner with the high tension terminal 6 of a stationary ignition coil 7. The primary winding of the ignition coil is connected in well known manner to an interrupter lever (not shown) opened periodically by a cam 8 carried by the rotor in proper timed relation, the cam either being ground directly on the rotor shaft or being a separate ring member, as shown, held in proper position on the shaft in any suitable way.

As best shown in Figs. 1 and 3, the rotor includes a bipolar magnet 10 of well known form. It may be cast from an alloy containing aluminum, nickel and iron, which besides being so hard as to necessitate grinding in finishing, is so brittle as to readily develop cracks when unduly stressed as for instance by forcing a smooth shaft through its shaft hole at 11, particularly if the shaft hole is distorted as by being crooked, slanted or out of round. By the construction herein disclosed, the grinding is reduced considerably and the shaft may be forced into place on the true axis of rotation in its bearings without cracking the magnet. This reduction in grinding is attained by providing a small hub 12 around the shaft hole at the front face only of the magnet, the remainder of that face and all of the other face of the magnet, as well as the bounding wall of the shaft hole, being left rough from the mold. The comparatively small annular area of this hub is ground at 13 to provide a locating surface thereat which is flat or smooth from which the magnet is aligned on the shaft, as hereinafter explained, notwithstanding any normal distortion of the shaft hole in the magnet and also notwithstanding any normal departure of the two end faces of the magnet from parallelism, due for instance to non-uniform shrinkage upon cooling of the alloy after casting. The rear-end portion 14 of the rotor shaft is of cold rolled steel, and to preclude cracking the magnet in being forced through the shaft hole thereof, it is knurled longitudinally at 15 with the ridges 16 initially peaked and initially of slightly greater outside diameter than the true diameter of the shaft hole 11 (about 10 to 40 thousandths of an inch greater) as indicated in an exaggerated way by the broken lines in Fig. 6. Upon pressing this knurled portion 15 into the hole 11 with the ground surface 13 of the magnet hub 12 held against the work seat of an assembling fixture, and with the rear-end portion 14 of the rotor shaft fed perpendicular thereto, some or all of the ridges 16 are shaved off by the harder metal of the magnet as hereinafter described to thereby compensate for any ordinary distortion of the shaft hole and to form a tight friction fit between the deformed ridges (which are frusto-conical in cross section as shown in Figs. 6 and 7) and the magnet at the bounding wall of the hole 11 throughout a substantial part of the periphery thereof and a substantial part of the axial length thereof. Furthermore, to prevent the shaft from cocking, the front face of the hexagonal portion 17 has a slight taper at 18 (see Figs. 4, 8 and 9) which results, upon pressure in screwing home the threaded end portion 19 into the drive-end portion 20 of the rotor shaft, in flattening or otherwise deforming the edge thereof to an annular area of contact with the abutting rear face of the magnet 10 even though that face of the magnet is rough and/or slightly off parallelism with the locating surface at 13. Upon assembly, the collar 21 fits tightly against the locating surface 13 of the magnet. The collar 21, of greater outer diameter than that of the hub 12, is then welded as indicated at 22 at a number of places around its periphery, in the pocket or depression formed therebetween, to securely fasten the drive-end part 20 of the rotor shaft to the magnet 10 and thereby prevent it from turning with respect thereto. It has been found from prolonged tests that the rear-end part 14 of the rotor shaft does not screw out in service, even when the magneto is driven through an impulse coupling because of the considerable amount of resistance thereto at the friction fits in the screw threads connecting the two shaft parts, as well as between the knurls and the bounding walls of the shaft hole and at the flattened surface of the hexagon portion 17. If desired, however, the rear-end part of the rotor shaft may also be welded to the magnet as shown at 23, or secured to the drive-end shaft in any other suitable way.

At the time the rotor shaft is welded to the magnet at 22, the thin solid pole shoes 24, laid flatwise over the polar faces, are welded underneath to the magnet along their circumferential surfaces at 25 (Figs. 1 and 3). By welding the pole shoes at those places, instead of at their front and rear longitudinal ends as heretofore, the milling of the ends of the pole shoes at 26 to the predetermined edge distance with the stator poles 27 cannot cut through or break at those welds, and also the length and area of magnetic contact between the poleshoes and magnet are much increased. The keyway at 28 is milled in the same set-up. The bearing journals at 29 and 30 are then ground to a high polish, as well as the tapered surface at 31. The outer surfaces of the pole shoes 24 are turned to correct diameter on the axis of rotation of the rotor shaft in its bearings.

As a result of the foregoing construction, the grinding of the magnet, which may be difficult and expensive on account of the extreme hardness of the alloy sometimes used, is reduced to substantially the minimum area desirable for a locating surface, and the number of parts and their weights are so reduced and so finished after assembly that the comparatively light, compact, rigid, accurately finished and durable rotor is attained inexpensively. Furthermore, the axis of rotation of the shaft in the drive-end and rear bearings 32 and 33 in the frame 1 extend through the shaft hole 11 at substantially right angles to the locating surfaces 13 so that there is a minimum amount of eccentricity of the magnet in rotation and a minimum amount of wear in the bearings resulting therefrom, whether the shaft hole is true, or out of round, or slanted or crooked. For instance, in Fig. 6, with the rotor shaft round throughout and perpendicular to the locating surface, the entire length of the top portions of ridges 16 of the knurled section 15 are shaved off uniformly around, and throughout their length, as indicated by the broken lines. In Fig. 7, with a non-round shaft hole, the ridges 16 are shaved off unequally around, and throughout their length, to compensate therefor. In Fig. 8, with a slanting shaft hole, the tops of the ridges 16 are shaved off unequally around at any diameter, and also to progressively varying extents along the axis of the shaft, to compensate therefor. In Fig. 9, with a crooked hole, the tops of the ridges 16 are shaved off to properly compensate therefor. Thus, notwithstanding the exactness or inexactness of the shaft hole 11 in any such normally cast magnet, the assembled shaft is deformed in assembly around and/or along the length of all or portions thereof to compensate for the distortion of the shaft hole with respect to the axis or center line of rotation of the shaft in its bearings extending through the shaft hole of the magnet at a predetermined angle, perpendicularly in this case, to the locating surface 11. Furthermore, there is in all these cases, a smooth friction fit between the deformed ridges 16 of the shaft, or at least some of them or for a portion at least of some or all of them, with the bounding wall of the shaft hole 11, thus constituting a support for the magnet for at least a substantial part of its length between end faces.

The foregoing factors contribute to a reduction in difficulties in the use of plain bearings, instead of ball bearings, particularly at the drive-end of the rotor shaft where the load is greater due to the weight of the magnet and the periodic magnetic breaks between the magnet and stator poles. By means of the lubricating arrangement herein disclosed, particularly in combination with this rotor, I have been able to provide a generator with such a plain bearing at the drive-end that it is capable of operation without seizure or freezing after long periods of operation and at rotor speeds higher than heretofore usual. The plain bearing 33 shown at the rear end of the magneto, and the lubricating arrangement therefor, are not necessarily parts of this invention but it is to be understood that the features herein shown at the drive-end of the magneto may be used at the rear end also, or at the rear end only.

At the drive-end bearing, the frame 1 has an end cross-member 34 accommodating an open-ended oil reservoir 35 at each side of the shaft, with a channel 36 connecting the two reservoirs around the back of the pressed-in ring 37 of porous bronze or similar material permitting the seepage of the oil therethrough for lubrication of the journal of the shaft. These reservoirs are free of all packings, felts and wicks and each has a cover 38 tightly pressed against a soft washer 39 seated in the frame 1 so as to form an oil-tight and permanent seal for the reservoir. The diametrically opposite location of the reservoirs in this way results in a proper supply of oil to the bearing in any angular position of magneto mounting, and the oil seal 40 precludes oil leakage from the bearing. It has been found that with this arrangement the proper amount of oil is supplied to the bearing under all usual operating conditions in the field and for practically the life of the magneto, with the result that seizure of the rotor shaft in the bearing is precluded as a practical matter at rotor speeds higher than has been usual heretofore with a magneto having a plain bearing at its drive-end. The rear-end bearing and its lubricating means may be the same as at the drive-end bearing.

While I have merely shown the preferred embodiment of this invention, it will be understood that many modifications thereof are possible within the intended broad meaning of the terms of the appended claims. So, also, the invention may be applied to other types of magnetos as well as to electric generators in general.

Having thus described my invention, what I claim is:

1. In a rotor for generators; a cast permanent magnet having a shaft hole which is unmachined for at least a part of its axial length, and also having a locating surface; and extending through said hole, a shaft having a knurled section of a material softer than said magnet and of an axial length of at least the unmachined length of said hole; at least a portion of the top surfaces of said knurled section being deformed, as a result of being forced into said hole and thereby shaved off by said magnet, to provide a smooth friction fit with the unmachined bounding wall of said hole throughout a substantial part of the periphery thereof and a substantial part of the axial length thereof, and the axis of said shaft extending through said hole at a predetermined angle to said locating surface.

2. In a rotor for generators; a cast permanent magnet having a shaft hole which is unmachined for at least a part of its axial length, and also having a locating surface; and extending through said hole, a shaft having a longitudinally knurled section of a material softer than said magnet and of an axial length of at least the unmachined length of said hole; at least some of the knurls of said knurled section being frusto-conical in cross section for at least a part of the length of said knurled section, as a result of being forced into said hole and thereby shaved off by said magnet, to provide a smooth friction fit with the unmachined bounding wall of said hole through a substantial part of the periphery thereof and a substantial part of the axial length thereof, and the axis of said shaft extending through said hole at a predetermined angle to said locating surface.

3. In a rotor for generators; a cast permanent magnet having a shaft hole which is distorted and which is unmachined for at least a portion of its axial length, and also having an exteriorly projecting hub around said hole with its radial face machined to form an annular locating surface; and extending through said hole, a shaft having a knurled section of a material softer than said magnet and of an axial length of at least the unmachined length of said hole; at least a portion of the top surfaces of said knurled section being deformed, as a result of being forced into said hole and thereby shaved off by said magnet, to provide a smooth friction fit with the unmachined bounding wall of said hole throughout a substantial part of the periphery thereof and a substantial part of the axial length thereof, and the axis of said shaft extending through said hole perpendicularly to said locating surface.

4. In a rotor for generators; a cast permanent magnet having a shaft hole which is distorted and which is unmachined for at least a portion of its axial length, and also having an exteriorly projecting hub around said hole with its radial face machined to form an annular locating surface; and extending through said hole, a shaft which has a knurled section of a material softer than said magnet and of an axial length of at least the unmachined length of said hole, and which also has a collar, of a diameter greater than said hub, abutting said locating surface and welded to said hub in the depression formed therewith; at least a portion of the top surfaces of said knurled section being deformed, as a result of being forced into said hole and thereby shaved off by said magnet, to provide a smooth friction fit with the unmachined bounding wall of said hole throughout a substantial part of the periphery thereof and a substantial part of the axial length thereof, and the axis of said shaft extending through said hole perpendicularly to said locating surface.

5. In a rotor for generators; a cast permanent magnet having a shaft hole which is unmachined for at least a part of its axial length, and also having a locating surface; and extending through said hole, a shaft which has a knurled section of a material softer than said magnet and of an axial length of at least the unmachined length of said hole, and which also has a collar conically tapered with respect to a radial face of said magnet with at least a portion thereof deformed to an annular ring near the periphery of said collar; at least a portion of the top surfaces of said knurled section being deformed, as a result of being forced into said hole and thereby shaved off by said magnet, to provide a smooth friction fit with the unmachined bounding wall of said hole throughout a substantial part of the periphery thereof and a substantial part of the axial length thereof, and the axis of said shaft extending through said hole at a predetermined angle to said locating surface.

WILLIAM D. CROCKER.